(12) United States Patent
Tracey

(10) Patent No.: US 7,864,714 B2
(45) Date of Patent: Jan. 4, 2011

(54) CAPABILITY MANAGEMENT FOR AUTOMATIC DIALING OF VIDEO AND AUDIO POINT TO POINT/MULTIPOINT OR CASCADED MULTIPOINT CALLS

(75) Inventor: Jonathan W. Tracey, Swavesey (GB)

(73) Assignee: LifeSize Communications, Inc., Austin, TX (US)

( * ) Notice: Subject to any disclaimer, the term of this patent is extended or adjusted under 35 U.S.C. 154(b) by 1172 days.

(21) Appl. No.: 11/119,601

(22) Filed: May 2, 2005

(65) Prior Publication Data
US 2006/0083182 A1    Apr. 20, 2006

Related U.S. Application Data

(60) Provisional application No. 60/619,210, filed on Oct. 15, 2004.

(51) Int. Cl.
H04Q 11/00    (2006.01)

(52) U.S. Cl. .................. 370/260; 370/261; 370/262; 370/263; 379/202.01

(58) Field of Classification Search ............... 370/219, 370/221, 225, 260–264, 276, 395.2, 400; 379/202.01–205.01, 90.01; 709/237; 710/8
See application file for complete search history.

(56) References Cited

U.S. PATENT DOCUMENTS

| | | | |
|---|---|---|---|
| 5,077,732 A | 12/1991 | Fischer et al. | |
| 5,276,681 A | 1/1994 | Tobagi et al. | |
| 5,365,265 A | 11/1994 | Shibata et al. | |
| 5,374,952 A | 12/1994 | Flohr | |
| 5,381,413 A | 1/1995 | Tobagi et al. | |
| 5,392,223 A | 2/1995 | Caci | |
| 5,446,735 A | 8/1995 | Tobagi et al. | |
| 5,491,797 A | 2/1996 | Thompson et al. | |
| 5,530,472 A | 6/1996 | Bregman et al. | |
| 5,550,982 A | 8/1996 | Long et al. | |
| 5,568,183 A | 10/1996 | Cortjens et al. | |

(Continued)

FOREIGN PATENT DOCUMENTS

EP    1515515 A1    3/2005

(Continued)

OTHER PUBLICATIONS

Automated Ranking of Database Query Results. Proceedings of the 2003 CIDR Conference. Sanjay Agrawal et al.*

(Continued)

*Primary Examiner*—Vivian Chin
*Assistant Examiner*—Friedrich Fahnert
(74) *Attorney, Agent, or Firm*—Meyertons Hood Kivlin Kowert & Goetzel, P.C.; Jeffrey C. Hood

(57) ABSTRACT

In various embodiments, a management system may query connection devices for their capabilities and store the information in a data structure. In some embodiments, the data structure may be in a form of a Deducible Capability Numbering (DCN) number. In some embodiments, the DCN number may describe the capabilities of a connection device using a series of representative numbers. After connecting the connection devices, the management system may continue monitoring capabilities of the connection devices and line failures. The management system may reconnect connection devices based on their capabilities if a line failure occurs.

26 Claims, 7 Drawing Sheets

U.S. PATENT DOCUMENTS

| | | | |
|---|---|---|---|
| 5,572,583 | A | 11/1996 | Wheeler et al. |
| 5,592,477 | A | 1/1997 | Farris et al. |
| 5,617,539 | A | 4/1997 | Ludwig et al. |
| 5,642,156 | A | 6/1997 | Saiki |
| 5,657,096 | A | 8/1997 | Lukacs |
| 5,689,553 | A * | 11/1997 | Ahuja et al. ............ 379/202.01 |
| 5,689,641 | A | 11/1997 | Ludwig et al. |
| 5,737,011 | A | 4/1998 | Lukacs |
| 5,751,338 | A | 5/1998 | Ludwig, Jr. |
| 5,764,277 | A | 6/1998 | Loui et al. |
| 5,859,979 | A | 1/1999 | Tung et al. |
| 5,867,495 | A | 2/1999 | Elliott et al. |
| 5,892,767 | A | 4/1999 | Bell et al. |
| 5,896,128 | A | 4/1999 | Boyer |
| 5,903,302 | A | 5/1999 | Browning et al. |
| 5,914,940 | A | 6/1999 | Fukuoka et al. |
| 5,940,372 | A | 8/1999 | Bertin et al. |
| 6,032,202 | A * | 2/2000 | Lea et al. ........................ 710/8 |
| 6,043,844 | A | 3/2000 | Bist et al. |
| 6,108,687 | A | 8/2000 | Craig |
| 6,147,988 | A | 11/2000 | Bartholomew et al. |
| 6,216,173 | B1 | 4/2001 | Jones et al. |
| 6,240,140 | B1 | 5/2001 | Lindbergh et al. |
| 6,253,247 | B1 * | 6/2001 | Bhaskar et al. ............. 709/237 |
| 6,262,978 | B1 | 7/2001 | Bruno et al. |
| 6,353,681 | B1 | 3/2002 | Nagai et al. |
| 6,357,028 | B1 | 3/2002 | Zhu |
| 6,477,248 | B1 | 11/2002 | Bruhnke et al. |
| 6,480,823 | B1 | 11/2002 | Zhao et al. |
| 6,594,688 | B2 | 7/2003 | Ludwig et al. |
| 6,621,515 | B2 | 9/2003 | Matthews et al. |
| 6,633,324 | B2 | 10/2003 | Stephens, Jr. |
| 6,633,985 | B2 | 10/2003 | Drell |
| 6,674,457 | B1 | 1/2004 | Davies et al. |
| 6,693,661 | B1 | 2/2004 | Vanderwilt et al. |
| 6,697,341 | B1 * | 2/2004 | Roy ............................ 370/260 |
| 6,704,769 | B1 | 3/2004 | Comstock et al. |
| 6,714,635 | B1 | 3/2004 | Adams et al. |
| 6,757,005 | B1 | 6/2004 | Elbaz et al. |
| 6,774,928 | B2 | 8/2004 | Bruzzone |
| 6,816,904 | B1 | 11/2004 | Ludwig et al. |
| 6,909,708 | B1 * | 6/2005 | Krishnaswamy et al. .... 370/352 |
| 6,975,721 | B1 | 12/2005 | Nimri et al. |
| 7,009,943 | B2 | 3/2006 | O'Neil |
| 7,016,341 | B2 | 3/2006 | Potter et al. |
| 7,043,749 | B1 | 5/2006 | Davies |
| 7,054,933 | B2 | 5/2006 | Baxley et al. |
| 7,081,827 | B2 | 7/2006 | Addy |
| 7,082,402 | B2 | 7/2006 | Conmy et al. |
| 7,174,365 | B1 | 2/2007 | Even |
| 2002/0152440 | A1 | 10/2002 | Yona et al. |
| 2002/0159394 | A1 | 10/2002 | Decker et al. |
| 2002/0188731 | A1 | 12/2002 | Potekhin et al. |
| 2003/0058836 | A1 | 3/2003 | Even |
| 2003/0156697 | A1 * | 8/2003 | Svercek .................. 379/202.01 |
| 2003/0174146 | A1 | 9/2003 | Kenoyer |
| 2004/0028035 | A1 | 2/2004 | Read |
| 2004/0037268 | A1 | 2/2004 | Read |
| 2004/0042553 | A1 | 3/2004 | Elbaz et al. |
| 2004/0114612 | A1 | 6/2004 | Even et al. |
| 2004/0183897 | A1 | 9/2004 | Kenoyer et al. |
| 2004/0252695 | A1 * | 12/2004 | Rasanen et al. .......... 370/395.2 |
| 2005/0198134 | A1 | 9/2005 | Kenoyer et al. |
| 2006/0106929 | A1 | 5/2006 | Kenoyer et al. |
| 2006/0256738 | A1 | 11/2006 | Kenoyer et al. |

FOREIGN PATENT DOCUMENTS

| | | |
|---|---|---|
| WO | 99/53719 | 10/1999 |

OTHER PUBLICATIONS

"A history of video conferencing (VC) technology" http://web.archive.org/web/20030622161425/http://myhome.hanafos.com/~soonjp/vchx.html (web archive dated Jun. 22, 2003); 5 pages.

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; http://www.video.ja.net/intro/; 2001; 26 pages.

Louis C. Yun and David G. Messerschmitt; "Architectures for Multi-Source Multi-User Video Compositing"; 1993; 9 pages; University of California at Berkley, Berkley CA.

"Conferencing Service Provision—How Ridgeway IP Freedom Helps the CSP"; 2002; 4 pages; Ridgeway Systems and Software Ltd.

"Deploying H.323 Conferencing on Your IP Network—Seeing, Hearing, and Sharing Across Networks"; First Virtual Communications Technical White Paper; 2000; 11 pages.

"Eye-to-Eye Video"; Retrieved from the Internet: http://itotd.com/articles/254/eye-to-eye-video/; Jul. 23, 2004; 6 pages.

"H.264 FAQ"; Retrieved from the Internet: http://www.apple.com/mpeg4/h264faq.html; 2005; 2 pages.

"IPfreedom—Enabling end-to-end IP Voice (VoIP) and Video communications by securely traversing firewalls and NATs"; Glowpoint Case Study; 2003; 4 pages; Ridgeway Systems & Software, Inc.

Victor Paulsamy and Samir Chatterjee; "Network Convergence and the NAT/Firewall Problems"; Proceedings of the 36th Hawaii International Conference on System Sciences; Jan. 2003; 10 pages.

"Personal videoconferencing from the desktop is better than ever" http://web.archive.org/web/20041009174345/www.wireone.com/products_desktop.php (web archive dated Oct. 9, 2004) (Copyright 2003); 2 pages.

"Radvision Firewall Cookbook"; Manual; Jan. 2002; 26 pages; Radvision.

Ira M. Weinstein; "Security for Videoconferencing: A guide to understanding, planning, and implementing secure compliant ISDN & IP videoconferencing solutions"; Jan.-Feb. 2004; 16 pages; Wainhouse Research.

"Traversing Firewalls and NATs With Voice and Video Over IP"; Whitepaper; Apr. 2002; 14 pages; Wainhouse Research, LLC & Ridgeway Systems and Software, Inc.

"Traversing Firewalls with Video over IP: Issues and Solutions" VCON Visual Communications, Whitepaper, Aug. 2003; 8 pages.

"V-Span" (http://web.archive.org/web/20040806213948/www.vspan.com/html/managedservices/vbm/index.html) (web archive dated Aug. 6, 2004); 2 pages.

E. J. Addeo, A. D. Gelman and A. B. Dayao; "A Multi-media Multi-point Communication Services Capability for Broadband Networks"; Mar. 1987; pp. 423-428; Bell Communications Research; Morristown, NJ.

E. J. Addeo, A.D. Gelman and A.B. Dayao; "Personal Multi-media Multi-point Communication Services for Broadband Networks", Global Telecommunications Conference and Exhibition; Nov.-Dec. 1988 pp. 53-57; vol. 1.

Elan Amir, Steven McCanne and Randy Katz; "Receiver-driven Bandwidth Adaptation for Light-weight Sessions"; Proceedings of the fifth ACM international conference on Multimedia; 1997; pp. 415-426; Berkeley, CA.

"Procedures for establishing communication between three or more audiovisual terminals using digital channels up to 1920 kbit/s" ITU-T H.243 (Feb. 2000); International Telecommunication Union; 62 pages; Geneva, Switzerland.

"Multipoint control units for audiovisual systems using digital channels up to 1920 kbit/s"; ITU-T H.231 (Jul. 1997) International Telecommunications Union; 21 pages.

"Polycom Executive Collection"; Jun. 2003; 4 pages; Polycom, Inc.; Pleasanton, CA.

E. F. Brown, J. O. Limb and B. Prasada; "A Continuous Presence Video Conferencing System"; National Telecommunications Conference Record; Dec. 1978; 5 pages; vol. 1.

Armando Fox, Steven D. Gribble, Eric A. Brewer, and Elan Amir; "Adapting to Network and Client Variability via On-Demand Dynamic Distillation" Proceedings of the seventh international conference on Architectural support for programming languages and operating systems;1996; pp. 160-170.

P. Galvez, H. Newman, C. Isnard and G. Denis; "Networking, Videoconferencing and Collaborative Environments"; Computer Physics Communications; May 1998; pp. 43-50; vol. 110, Issue 1-3.

Tohru Hoshi, Kenjiro Mori, Yasuhiro Takahashi Yoshiyuki Nakayama, and Takeshi Ishizaki; "B-ISDN Multimedia Communication and Collaboration Platform Using Advanced Video Workstations to Support Cooperative Work"; IEEE Journal on Selected Areas in Communications; Dec. 1992; pp. 1403-1412; vol. 10, No. 9.

A.B. Larsen and E.F. Brown; "'Continuous Presence' Video Conferencing at 1.5-6 Mb/sec"; Teleconferencing and Interactive Media, University of Wisconsin Extension Center for Interactive Programs; 1980; 8 pages.

Aurel Lazar, Koon-Seng Lim and Franco Marconcini; "Realizing a Foundation for Programmability of ATM Networks with the Binding Architecture"; IEEE Journal on Selected Areas in Communications; Sep. 1996; pp. 1214-1227; vol. 14, No. 7.

Aurel A. Lazar, Koon-Seng Lim and Franco Marconcini; "xbind: The System Programmer's Manual"; Technical Report; Jun. 1996; 69 pages; Center for Telecommunications Research; Columbia University, New York.

Michael E. Lukacs; "The Personal Presence System—Hardware Architecture", Proceedings of the Second ACM International Conference on Multimedia; Oct. 1994; pp. 69-76; Bell Communications Research.

Shigeki Masaki, Hiroyuki Yamaguchi, Yasuhito Hayashi, Takashi Nishimura, and Kazunori Shimamura; "Multimedia Handling Scheme in a Groupware System for B-ISDN"; IEEE Global Telecommunications Conference; Dec. 1992; pp. 747-751; NTT Human Interface Labs.

Shigeki Masaki, Hiroyuki Yamaguchi Hideya Ichihara and Kazunori Shimamura; "A Desktop Teleconferencing Terminal Based on B-ISDN: PMTC"; NTT Review; Jul. 1992; pp. 81-85; vol. 4, No. 4.

Steven McCanne; "Scalable Multimedia Communication with Internet Multicast, Light-weight Sessions, and the Mbone"; 1998; 32 pages; University of California Berkeley.

Leysia Palen; "Social, Individual and Technological Issues for Groupware Calendar Systems" Conference on Human Factors in Computing Systems; 1999; pp. 17-24.

Roderick E. Perkins; "Spider: Investigation in Collaborative Technologies and Their Effects on Network Performance"; Global Telecommunications Conference; Dec. 1991; pp. 2074-2080; vol. 3.

Wilko Reinhardt; "Advance Reservation of Network Resources for Multimedia Applications"; Proceedings of the Second International Workshop on Multimedia: Advanced Teleservices and High-Speed Communication Architectures; 1994; pp. 23-33.

Shaker Sabri and Birendra Prasada; "Video Conferencing Systems"; Proceedings of the IEEE; Apr. 1985; pp. 671-688; vol. 74, Issue 4.

Marc H. Willebeek-LeMair and Zon-Yin Shae; "Videoconferencing over Packet-Based Networks" IEEE Journal on Selected Ares in Communications; Aug. 1997; 1101-1114; vol. 15, No. 6.

"How Glowpoint Works", http://web.archive.org/web/20031008073034/www.glowpoint.com/pages/about/how.html, web archive dated Oct. 8, 2003; 1 page.

Aurel A. Lazar and Koon-Seng Lim; "Programmability and Service Creation for Multimedia Networks"; Fifth IEEE International Symposium on High Performance Distributed Computing; 1996; pp. 217-223.

Elan Amir, Steven McCanne, and Hui Zhang; "An Application Level Video Gateway"; In Proceedings of ACM Multimedia '95; 1995; 18 pages.

"Tunnel: A simple UDP/TCP tunnel application"; www.tunnel.mrq3.com from web archive: http://web.archive.org/web/20040901071149/http://tunnel.mrq3.com/, dated 2004; 2 pages.

Apple Computer, Inc. "Apple 'Open Sources' Rendevous," Press Release, Sep. 25, 2002, Cupertino, California, Apple.com.

Stephan Somogyi, "Apple's Rendezvous: What it is and why it matters," Article, Aug. 28, 2002, CNET Networks, Inc., online at http://review.zdnet.com/4520-6033_16-4207554.html.

U.S. Appl. No. 11/858,342, entitled "Videoconferencing System Discovery", by Matthew K. Brandt, filed on Sep. 20, 2007.

* cited by examiner

US 7,864,714 B2

CAPABILITY MANAGEMENT FOR AUTOMATIC DIALING OF VIDEO AND AUDIO POINT TO POINT/MULTIPOINT OR CASCADED MULTIPOINT CALLS

PRIORITY

This application claims priority to U.S. Provisional Patent Application Ser. No. 60/619,210 titled "Video Conference Call System", which was filed Oct. 15, 2004, whose inventors are Michael J. Burkett, Ashish Goyal, Michael V. Jenkins, Michael L. Kenoyer, Craig B. Malloy, and Jonathan W. Tracey.

BACKGROUND OF THE INVENTION

1. Field of the Invention

The present invention relates generally to video and audio conferencing systems, video and audio conferencing infrastructure devices, and, more specifically, to networks for video and audio conferencing systems.

2. Description of the Related Art

Video and audio conference systems may allow participants in multiple locations to communicate in a conference. These conference call systems may rely on external agents such as gatekeepers to determine how to connect various calling devices for a conference call. Gatekeepers may distribute load and route traffic between zones using preprogrammed rules according to various types of callers that may participate in networked conference calls. The gatekeepers may further rely on databases to store information about the caller types and abilities. While the gatekeepers may use database inquiries and the preprogrammed rules to determine how to connect callers, setting up calling rules through the gatekeeper may be time consuming.

SUMMARY OF THE INVENTION

In various embodiments, a management system, coupled to a network of connection devices may query the connection devices for capabilities of each connection device (e.g., current abilities such as what network(s) the connection device can access, etc.) and store the received information (e.g., in a data structure). In some embodiments, the data structure may be in a form of a Deducible Capability Numbering (DCN) number. In some embodiments, the DCN number may describe the capabilities of a connection device using a series of representative numbers. For example, the DCN may be a human readable string of numbers and/or characters (e.g., ASCII or Unicode characters) with multiple delimited fields. In some embodiments, other data structures may be used. For example, the information may be sent as a set of numbers and/or text in a management system readable format. After connecting the connection devices, the management system may continue monitoring capabilities of the connection devices. In addition, the management system may monitor line failures and, if needed, reconnect connection devices based on the capabilities of each connection device. For example, the management system may instruct a first connection device to reconnect with a second connection device if the first connection device loses its connection to the conference call.

BRIEF DESCRIPTION OF THE DRAWINGS

A better understanding of the present invention may be obtained when the following detailed description is considered in conjunction with the following drawings, in which.

Figure 1:
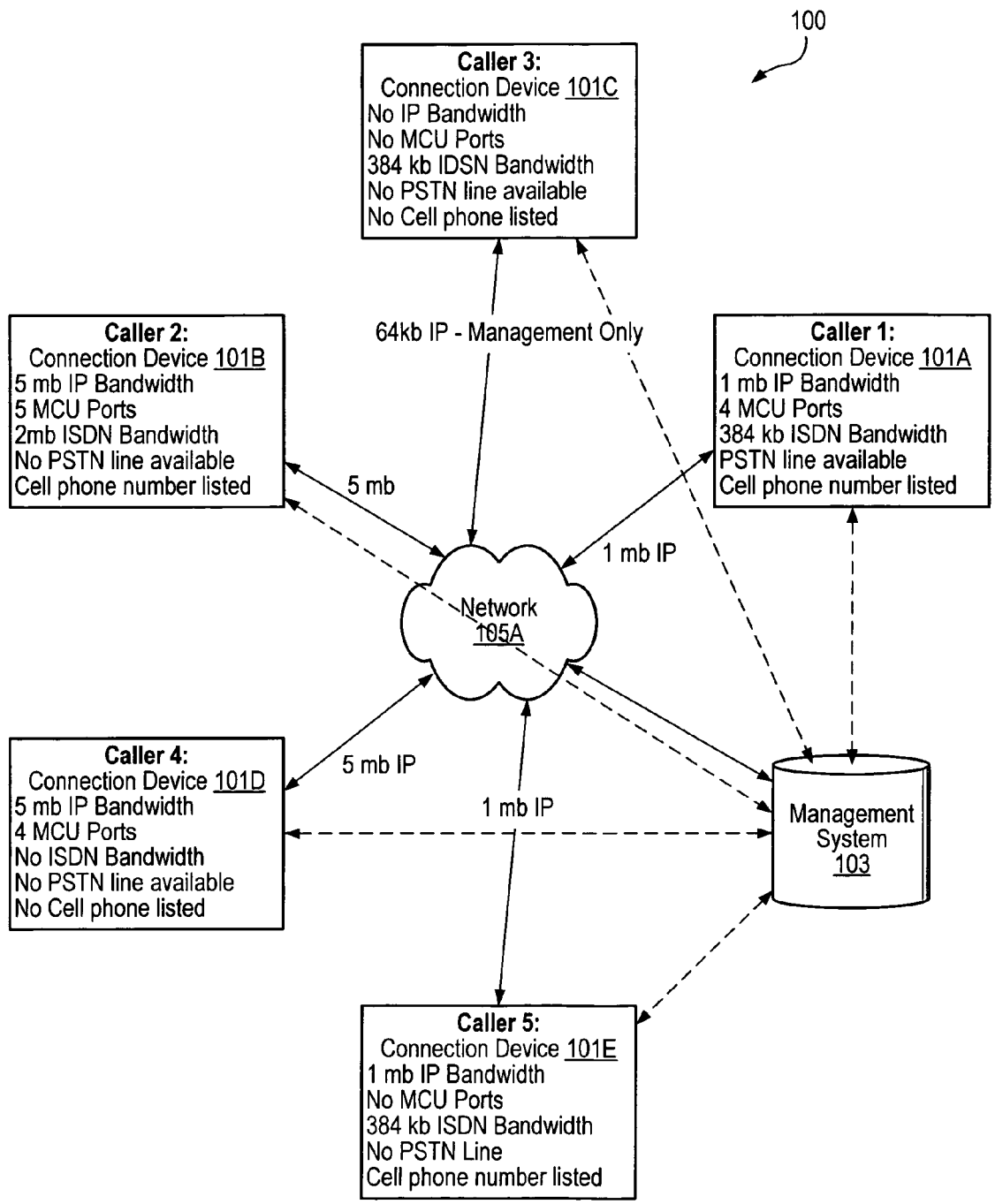
FIG. 1 illustrates five connection devices being managed by a management system, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE INVENTION

Incorporation by Reference

U.S. Provisional Patent Application Ser. No. 60/619,303, titled "Speakerphone", which was filed Oct. 15, 2004, whose inventors are Michael L. Kenoyer, William V. Oxford, and Simon Dudley is hereby incorporated by reference in its entirety as though fully and completely set forth herein.

U.S. Provisional Patent Application Ser. No. 60/619,212, titled "Video Conferencing Speakerphone", which was filed Oct. 15, 2004, whose inventors are Michael L. Kenoyer, Craig B. Malloy, and Wayne E. Mock is hereby incorporated by reference in its entirety as though fully and completely set forth herein.

U.S. Provisional Patent Application Ser. No. 60/619,227, titled "High Definition Camera and Mount", which was filed Oct. 15, 2004, whose inventors are Michael L. Kenoyer, Patrick D. Vanderwilt, Paul D. Frey, Paul Leslie Howard, Jonathan I. Kaplan, and Branko Lukic, is hereby incorporated by reference in its entirety as though fully and completely set forth herein.

U.S. Provisional Patent Application Ser. No. 60/619,210, titled "Video Conference Call System", which was filed Oct. 15, 2004, whose inventors are Michael J. Burkett, Ashish Goyal, Michael V. Jenkins, Michael L. Kenoyer, Craig B. Malloy, and Jonathan W. Tracey is hereby incorporated by reference in its entirety as though fully and completely set forth herein.

In various embodiments, conference calls may include connection devices. As used herein, "connection device"

includes endpoint devices, infrastructure devices, and other network devices. Endpoint devices may include videophones and audio phones (e.g., speakerphones, cellular telephones, etc.). In some embodiments, infrastructure devices provide functions between endpoints and may include multipoint conference units (MCUs), gateways (e.g., an integrated services digital network (ISDN) to Internet protocol (IP) gateway), gatekeepers, and call processing servers (CPS). Conference calls between multiple participants may be challenging to set up and reestablish if one of the connection devices is disconnected during the call. In various embodiments, information about each of the involved connection devices may be collected and examined to configure connections between the connection device to allow video and audio conference calls to be automatically established and re-established if they fail. In some embodiments, the information from the connection devices may be sent from the connection devices as a Deducible Capability Numbering (DCN) number. In some embodiments, the information may be converted into a DCN number by a management system. DCN may be used by a management system to manage calls through multiple network types and connection device types. The management system 103 may route calls by the best transport without using a gatekeeper device. In some embodiments, a gatekeeper device may be used.

FIG. 1 illustrates an embodiment with five connection devices being managed by management system. In various embodiments, the management system 103, coupled to a network 105 of connection devices may query one or more connection devices 101 coupled to network 105 for capabilities of each connection device 101 (e.g., current abilities such as what network(s) the connection device can access, etc.) and may store information associated with the capabilities of each connection device 101. In some embodiments, the information may be stored in a data structure. In some embodiments, the data structure may be in a form of a DCN number for each connection device. In some embodiments, a DCN may describe the capabilities of a connection device using a series of representative numbers. For example, the DCN may be a human readable string of numbers and/or characters (e.g., ASCII or Unicode characters) with multiple delimited fields. In some embodiments, other data structures may be used. For example, the information may be sent as a set of numbers and/or text in a management system 103 readable format.

Figure 2:
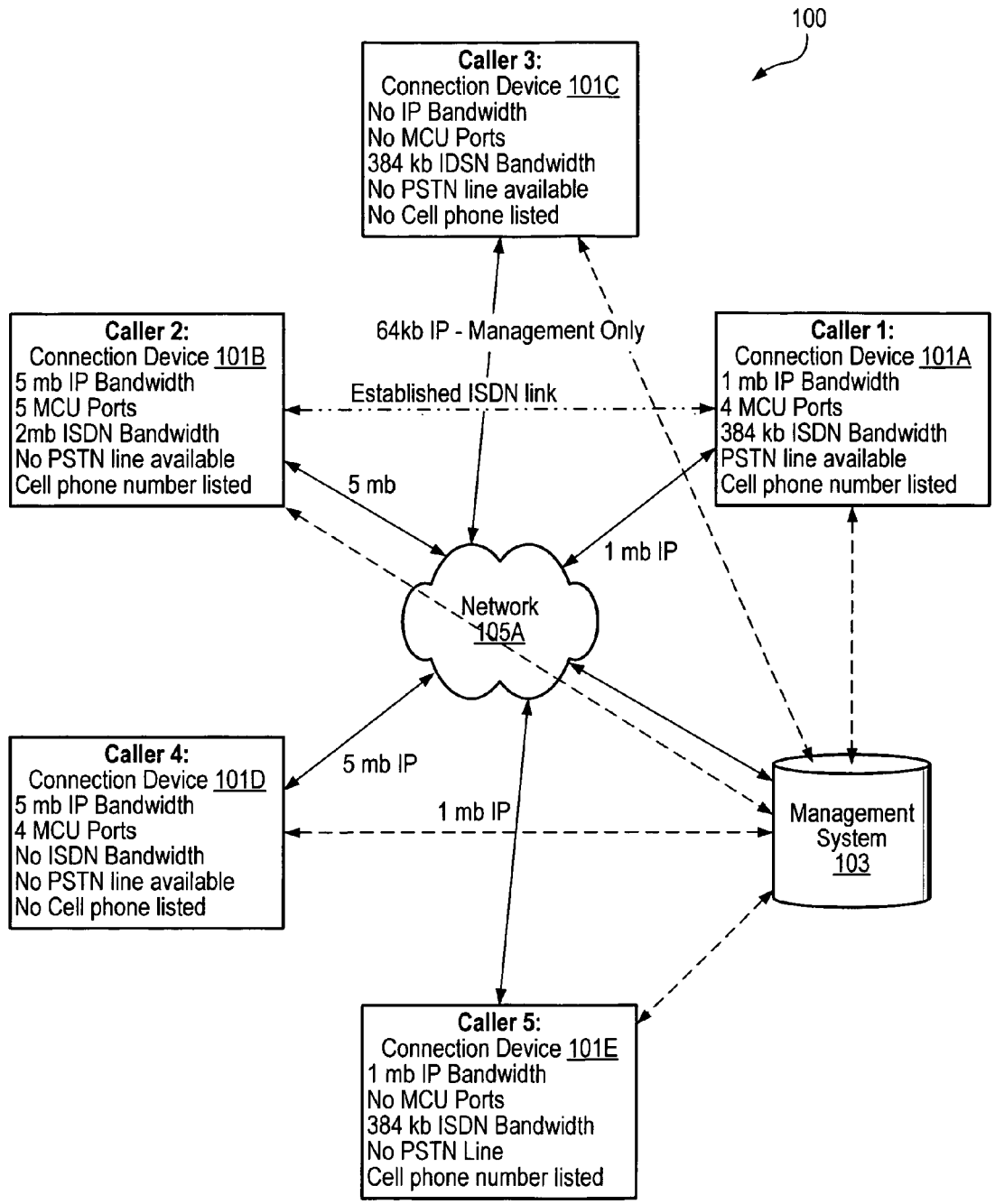
FIG. 2 illustrates a management system using a DCN to correct a failed connection, according to an embodiment.

After connecting the connection devices, the management system 103 may continue monitoring capabilities of the connection devices 101. In addition, the management system 103 may monitor line failures and, if needed, reconnect connection devices 101 based on the capabilities of each connection device 101. For example, the management system 103 may instruct a first connection device 101a to reconnect with a second connection device 101B if the first connection device 101a loses its connection to the conference call (as seen in FIG. 2).

In some embodiments, the information collected/received may include one or more of a maximum available bandwidth, a number of multipoint ports, IP capabilities, Primary Rate Interface (PRI) information, ISDN information, Basic Rate Interface (BRI) information, V.35 capability, V.35 Speed, Encryption Capability, public switch telephone network (PSTN) capability, cellular telephone capability, general packet radio service (GPRS) capability, 3G mobile capability, and/or if a user has subscribed to a service (e.g., a service of the management system 103).

Primary-Rate Interface (PRI) is a type of ISDN service designed for larger organizations. PRI may include 23 B-channels (30 in Europe) and one D-Channel. In contrast, BRI (Basic-Rate Interface), which is designed for individuals and small businesses, may contain just two B-channels and one D-channel. V.35 refers to an International Telecommunication Union (ITU) standard for high-speed synchronous data exchange. In the United States, V.35 is an interface standard used by many routers and Data/Digital Service Units (DSUs) that connect to T-1 carriers. PSTN refers to the international telephone system based on analog voice data.

Other capabilities of a connection device 101 may also be considered. In some embodiments, through DCN, one or more numbers may be assigned for each involved capability, and the numbers may be grouped into fields. For example, in some embodiments, a five digit bandwidth, a two digit multipoint, a one digit IP, a two digit PRI, a two digit BRI, a one digit V.35, a three digit V.35 speed, a one digit encrypt, a one digit PSTN, a one digit cell, and a one digit service indicator may be assigned. Other groupings, numbers, and capabilities may also be used. For instance, a connection device 101 may have a score or DCN of "10248121000011281111" which may be broken down into:

| | |
|---|---|
| 10240 | Bandwith (10 megabyte bandwith) |
| 12 | Multipoint (12 multipoint ports available) |
| 1 | IP (IP capable) |
| 00 | PRI (zero or no PRI lines) |
| 00 | BRI (zero or no BRI lines) |
| 1 | V.35 (V.35 interface present) |
| 128 | V.35 Speed (128k V.35 bandwidth) |
| 1 | Encrypt (encryption capable) |
| 1 | PSTN (PSTN interface available) |
| 1 | Cell (cellular telephone number in directory) |
| 1 | Service (user has subscribed to service) |

In some embodiments, each PRI cable may comprise multiple b channels. In some embodiments, each BRI line may have 2 b channels (2×64 kilobytes/sec (kb/s)). In some embodiments, the DCN may be longer and/or may represent additional information about a connection device. In some embodiments, the DCN may be short and/or represent less information about each connection device. As another instance, a connection device may have a score or DCN of "0019212100040001001" which may be broken down into:

| | |
|---|---|
| 00192 | Bandwidth (192k bandwidth |
| 12 | Multipoint (12 multipoint ports) |
| 1 | IP (IP capable) |
| 00 | PRI (zero or no PRI ISDN lines) |
| 04 | BRI (4 B-Channels on BRI interface(s)) |
| 0 | V.35 (no V.35 interface) |
| 000 | V.35 Speed (no V.35 interface) |
| 1 | Encryption (encryption capable) |
| 0 | PSTN (no PSTN interface) |
| 0 | Cell (no cell phone number has been provided) |
| 1 | Service (user has subscribed to service) |

In some embodiments, the DCN may be used in a scoring and/or ranking system to allow the management system 103 to determine and rank connection device capabilities. Management system 103 may use connection device capabilities when auto establishing or reconnecting calls. In some embodiments, to establish a call, the score or DCN of the connecting connection devices 101 may be compared (e.g., by the management system 103) and a connection device 101 with the greatest capability may be selected for the other connection devices 101 to connect to. For example, in the two scores given above, the first connection device 101 may be chosen as the most capable connection device 101 (e.g., because its score or DCN indicates that it has more bandwidth available), and the other connection devices 101 may be instructed to connect to the first connection device 101. Other considerations may also be taken into account. For example, if several connection devices need a BRI line to connect and, therefore, a number of BRI lines is important, the second connection device 101 may be chosen, and the other connection devices 101 may be instructed to connect to the second connection device 101. As another example, if several connection devices are encryption capable, an encryption capable connection device may be selected since none of the connection devices may be able to use encryption if the central connection device does not support encryption.

In some embodiments, the management system 105 may use flowcharts and/or rules to select the best connection device. For example, the capabilities of the connection devices may be weighted based on the needs of the call. As a simplified example, if each device requires a BRI line, the number of BRI lines for each connection device may be weighted more heavily than the number of PRI lines available from a connection device (which may receive a weight of 0 in this case). The information for the comparison may be from a data structure (such as a DCN). If a first connection device has 3 BRI lines and 1 PRI line it may receive a score of (3 BRI*1 (weight)+1 PRI*0 (weight))=3. A second connection device may have 2 BRI lines and 4 PRI lines to receive a score of (2 BRI*1 (weight)+4 PRI*0 (weight))=2. The first connection device may be ranked first (because of the higher score) and may be chosen as the connection device the other connection devices should connect to. It is to be understood that more complicated rules may be used to take into consideration additional capabilities and needs of the connection devices in a conference call. In some embodiments, the rules may be formed by the system based on the type of connection devices that need to be connected in the conference call (e.g., weights may be developed to more heavily weight connection types that are needed).

In some embodiments, the flowcharts and rules may be implemented in software or hardware on the management system 105. Flowcharts and rules may also be used to determine which systems should make the calls and which systems should cascade parts of the network 105 together. In some embodiments, default rules may be programmed into a system. In some embodiments, a user may modify the flowcharts and rules to modify priorities for selecting connection devices in a network.

In various embodiments, management system 103 may continually query attached connection devices for information (e.g., in the form of a DCN or other data structure). The management system 103 may use variable polling to query the connection devices 101 at a variable rate. For example, as connection devices 101 connect and disconnect, the available capabilities of each connection device 101 may change (e.g., an additional network connection on a connection device may become available if a connecting connection device disconnects or less bandwidth may be available as more connection devices connect to a connection device). In some embodiments, the management system 103 may only collect the connection device's information when the connection device is first attached to the management system 103. In some embodiments, the management system 103 may poll the connection devices through a translation matrix. For example, the translation matrix may translate the request from the management system 103 for the connection device's capabilities into information that the connection device can process. In some embodiments, gatekeeper devices may monitor connected connection devices to determine if their DCN has changed. In some embodiments gatekeeper devices may be identified, as a resource on the network, using a DCN.

In some embodiments, multiple connection devices may be selected to connect to other connection devices to establish a conference call. For example, several connection devices may connect to one of two main connection devices and/or the two main connection devices may connect to each other to connect all the connection devices in the call. In some embodiments, when a call is established, a call management system 103 may use the DCN to determine where calls are to be bridged from and what transports and speeds are to be used. In the event of a failure, the call may be rerouted using other information stored in the DCN (e.g., an IP connection between two connection devices may fail). In some embodiments, the management system 103 may check a DCN of each connection device 101. For example, a connection device 101 may have ISDN capabilities and therefore one of the failing connection devices may be instructed to dial into the connected connection device with ISDN capability to reestablish the call.

In some embodiments, as data structures such as DCNs are updated, the management system 103 may manage bridges and gateways according to connection device capabilities to route and cascade calls. In some embodiments, redundancy may be built into a video network with calls re-routed/reestablished if parts of the network fail or become unavailable.

As seen in FIG. 1, conference call system 100 may include a network 105A, a management system 103 coupled to network 105A, and connection devices 101a-101e coupled to network 105. A connection device 101 (including 101A-101E) may be coupled to network 105A in a wired or wireless fashion. Connection device 101 (including 101A-10E) may include various wireless or wired communication devices, such as a wireless Ethernet (e.g., IEEE 802.11) card, paging logic, RF (radio frequency) communication logic, a wired Ethernet card, a modem, a DSL device, a cable (television) modem, an ISDN device, an ATM (asynchronous transfer mode) device, a parallel or serial port bus interface, and/or other types of communication devices.

In various embodiments, network 105 (i.e., including network 105A-105D) may include and/or be coupled to other types of communications networks, such as a public switched telephone network (PSTN), where connection devices 101 may send and receive information from/to the PSTN or other communication networks. In some embodiments, network 105 thus may be, or be coupled to, any of various wide area networks (WANs), local area networks (LANs), corporate networks, including the Internet. In some embodiments, connection devices 101, network 105, and/or management system 103 may use one or more secure methods and/or secure techniques for communication.

Network 105 (i.e., including networks 105A-105D) may include one or more wireless networks, e.g., based on IEEE 802.11 and/or IEEE 802.16. Network 105 (i.e., including networks 105A-105D) may include one or more wireless networks, e.g., based on Ethernet. Network 105 (i.e., including networks 105A-105D) may include one or more digital subscriber lines (DSLs) and/or cable (e.g., cable television) networks and/or infrastructures. For example, network 105 (including networks 105A-105D) may include one or more of: cable modems, cable modem termination systems (CMTSs), satellite modems, DSL modems, DSL access multiplexers (DSLAMs), broadband remote access servers (BRASs), and/or metropolitan area networks (MANs), among others. Network 105 (including networks 105A-

105D) may form part of the Internet, or may couple to other networks, e.g., other local or wide area networks, such as the Internet. Thus, connection devices 101A-101E and/or management system 103 may be coupled together using a PSTN, e.g., Ethernet cable and DSL or Ethernet cable and ISDN; a cable (television) based network; a satellite-based system; and/or a fiber based network; among others.

In some embodiments, a DCN number (i.e. score) may be assigned to each connection device 101 based on capabilities of connection devices 101, and the DCN numbers may be used to establish a conference call within conference call system 100. For example, management system 103 may receive a request to connect connection devices 101A-101E in a conference call. Management system 103 may use the DCN numbers to first determine if any one of the connection devices 101 is capable of bridging some or all of the callers 101. For instance, connection device 101C (i.e., caller 3) may only be operable to support ISDN, and management system 103 may check if the other connection devices 101A-101B and 101D-101E may bridge and/or support ISDN. Management system 103 may send instructions to connection device 101B (i.e., caller 2) to connect to connection devices 101A and 101C-101E through an Internet connection of network 105. In this example, management system 103 may determine that the call will include 1 mbps (megabits per second) to each of the IP-based connection devices 101A-101B and 101D-101E and 384 kbps (kilobits per second) ISDN to connection device 101C.

As shown in FIG. 2, if a connection of connection device 101A were to fail, management system 103 may use information of the DCN of connection device 101A to determine that connection device 101A has 3 BRIs, and a bridging connection device 101C (i.e., caller 3) may be instructed to connect to management system 103 using a BRI (e.g., ISDN) connection. In some embodiments, this may occur within a few seconds. In some embodiments, if a connection to connection device 101A is not re-established, a user of connection device 101A may be contacted using a cellular telephone number that is stored in management system 103. In some embodiments, the user may be contacted in order to inform the user of the problem and/or to determine if another connection device is available to the user. Other methods for reestablishing a connection to connection device 101A and/or contacting the user of a connection device may also be performed.

Figure 3:
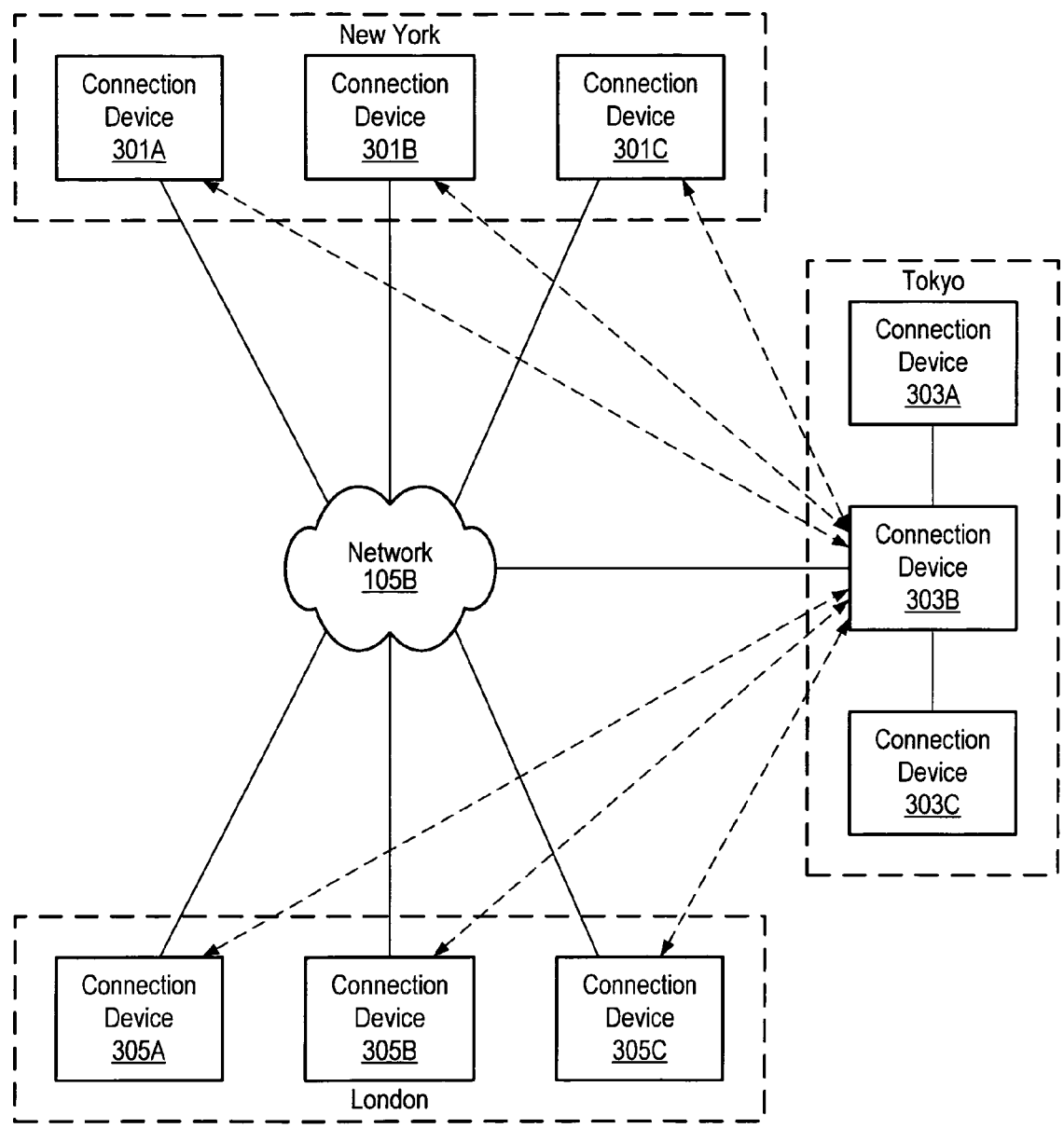
FIG. 3 illustrates nine connection devices using DCN to register with a single multipoint control unit (MCU), according to an embodiment.

As shown in FIG. 3, in an embodiment with nine callers (e.g., three connection devices 301 in New York), (three connection devices 303 in Tokyo), and (three connection devices 305 in London), management system 103 may determine how to couple the caller's connection devices based on the connection devices DCN numbers. In some embodiments, each connection device may be instructed to couple to a single MCU (e.g., through a network 105B). For example, connection devices 301, 303, and 305 may be coupled to connection device 303B in Tokyo.

Figure 4:
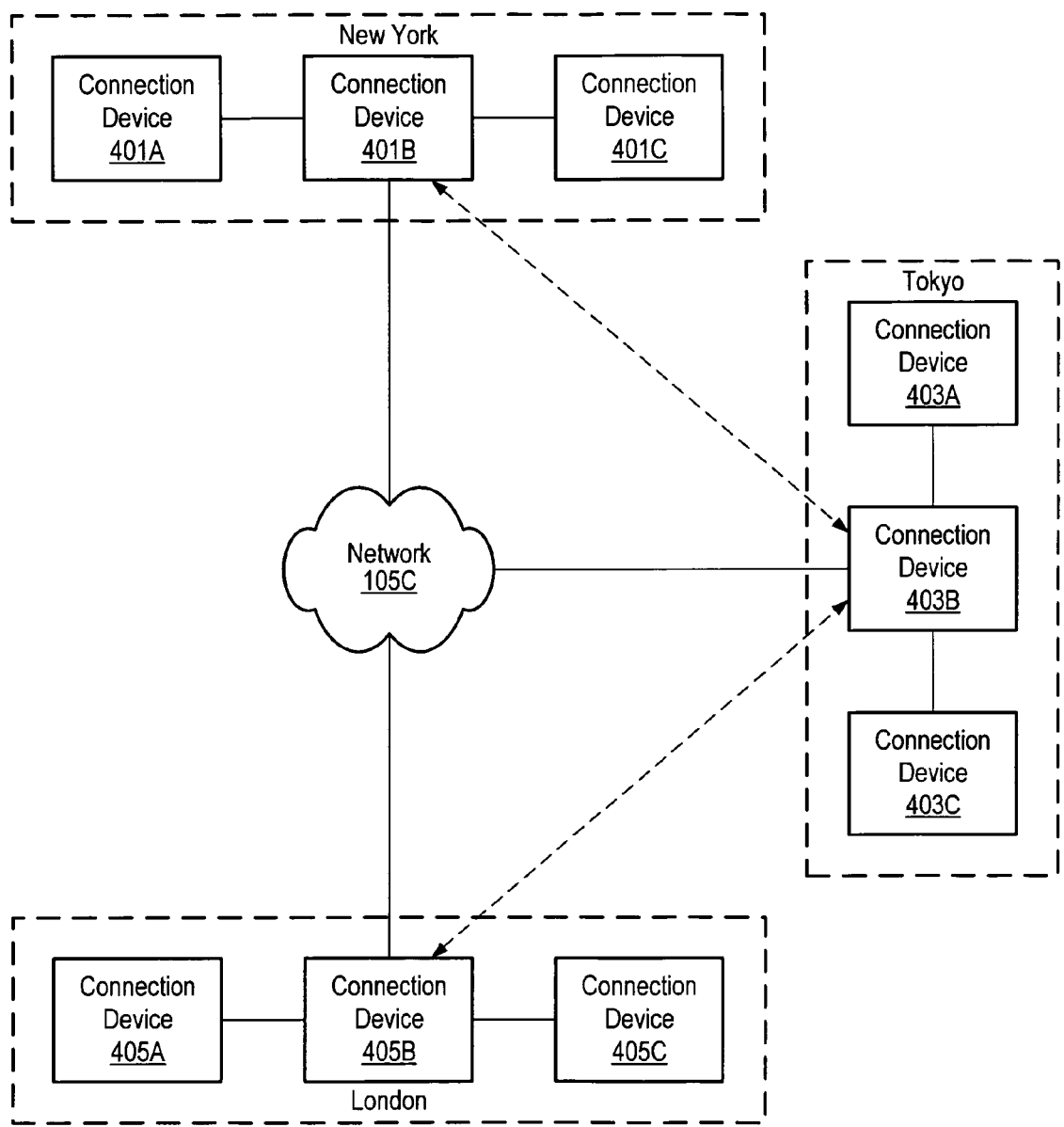
FIG. 4 illustrates nine connection devices using DCN to register with a local MCU cascaded with other MCUs, according to an embodiment.

As shown in FIG. 4, a management system may determine each connection device should couple to a local MCU connection device and the local MCU connection devices should cascade together. For example, connection device 401A and 401C may couple to connection device 401B, connection device 403A and 403C may couple to connection device 403B, and connection device 405A and connection device 405C may couple with connection device 405B. In some embodiments, connection device 401B and connection device 405B may couple to connection device 403B. In some embodiments, the connection devices may couple to the local MCU and the local MCUs may cascade together through a network 105C.

Figure 5:
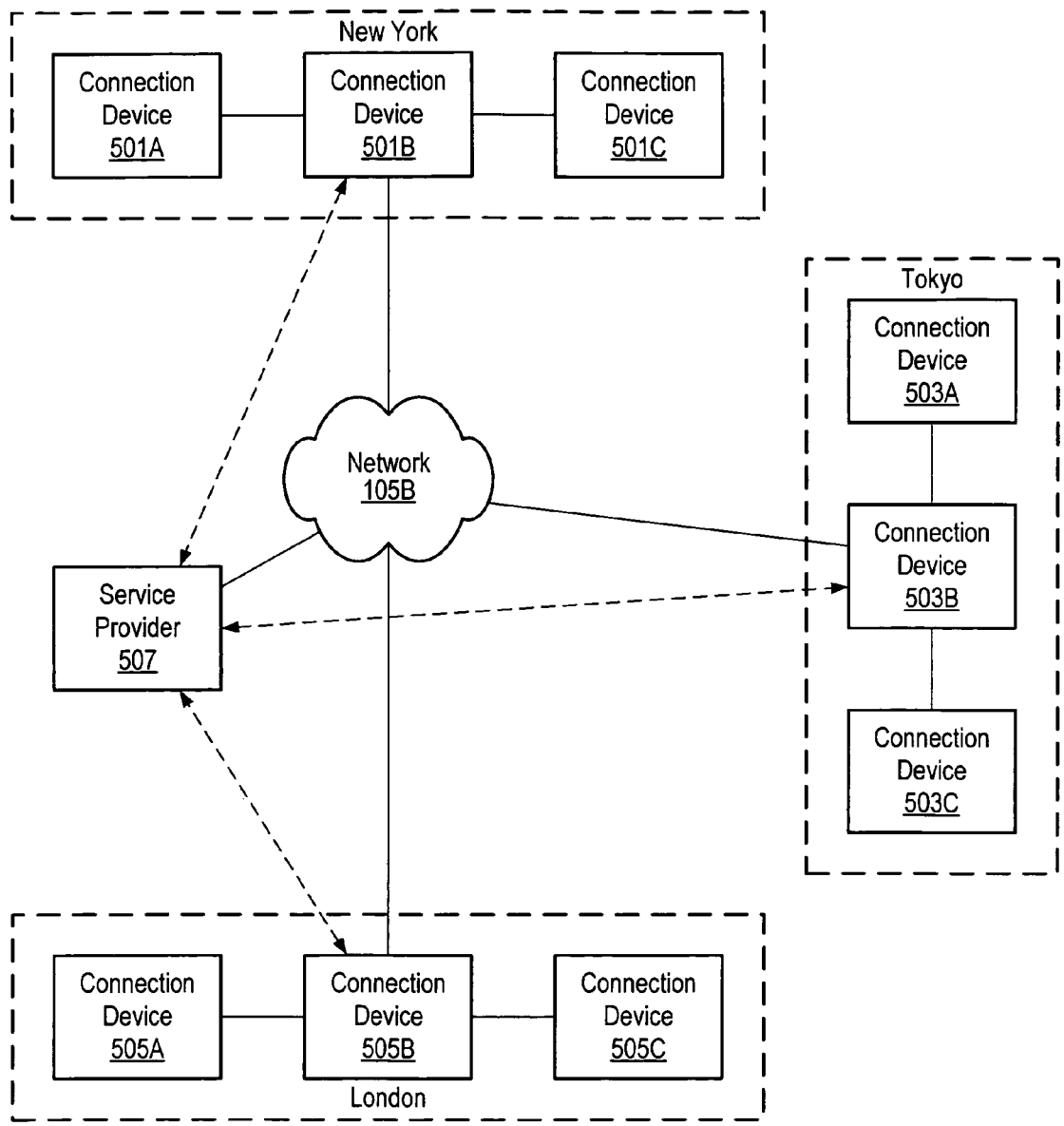
FIG. 5 illustrates nine connection devices using DCN to register with a local MCU with the MCUs cascading through a service provider, according to an embodiment.

As shown in FIG. 5, the management system may determine each connection device should register with a local MCU and the MCUs may cascade together through a service provider 507. For example, connection devices 501A and 501C may connect to connection device 501B. Connection devices 503A and 503C may couple to connection device 503B, and connection devices 505A and 505C may couple to connection devices 505B. Other connection and/or coupling schemes are also contemplated. In various embodiments, if a connection to a connection device fails, the management system may be able to determine a backup connection and/or coupling to use.

Figure 6:
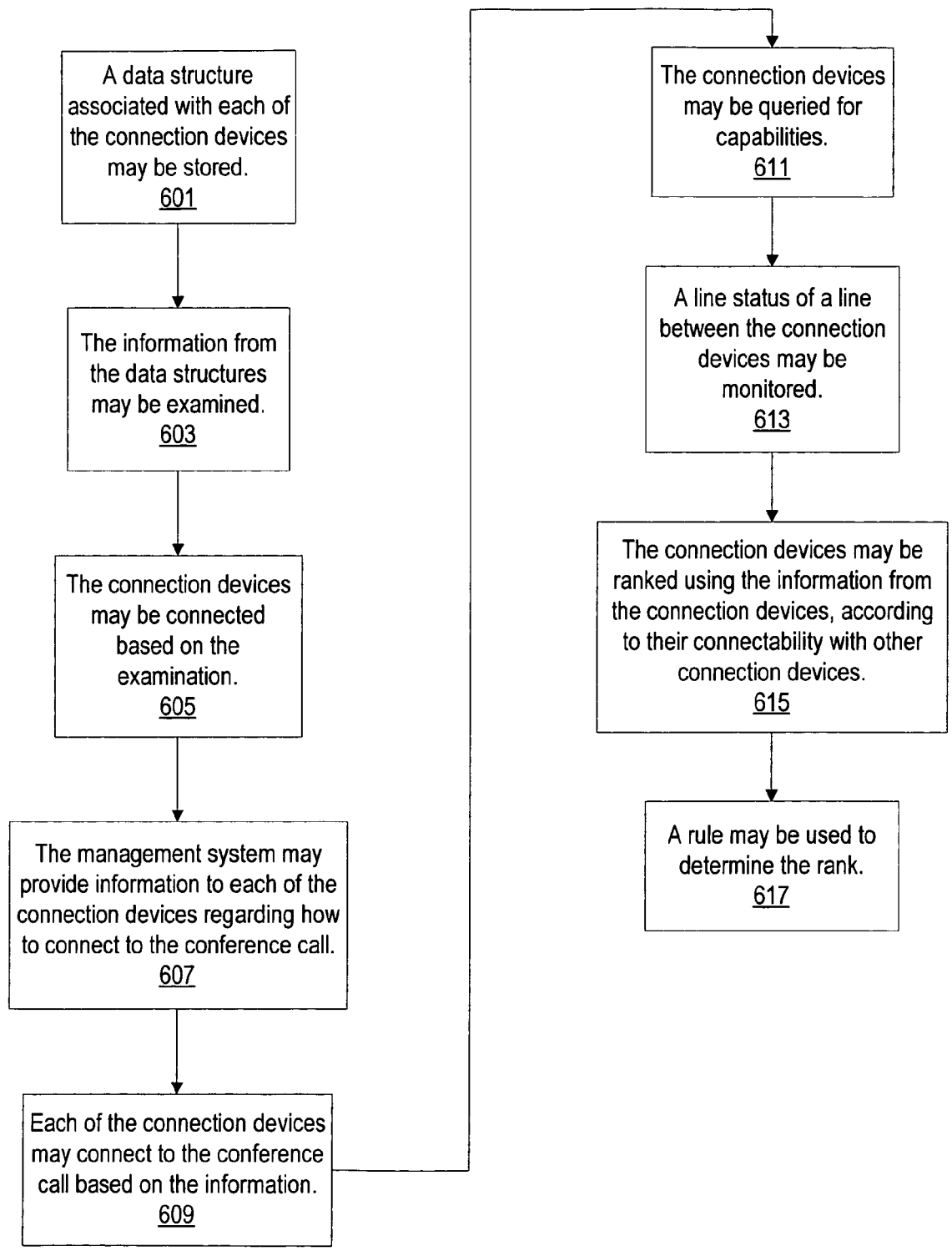
FIG. 6 illustrates a method for connecting multiple connection devices using data structures, according to an embodiment.

FIG. 6 illustrates a method for connecting multiple connection devices using data structures, according to an embodiment. It is noted that in various embodiments one or more of the method elements may be performed concurrently, in a different order, or be omitted. Additional elements may be performed as desired.

At 601, a data structure associated with each of the connection devices of the conference call may be stored. In some embodiments, each data structure may include information regarding the connection device capabilities. In some embodiments, the capabilities may include maximum bandwidth, a number of multipoint ports, IP capabilities, PRI capabilities, ISDN capabilities, BRI capabilities, V.35 capability, V.35 speed, encryption capability, PSTN capabilities, cellular telephone capability, and a status of user subscription.

At 603, the information from the data structures may be examined.

At 605, the connection devices may be connected based on the examination.

At 607, the management system may provide information to each of the connection devices regarding how to connect to the conference call.

At 609, each of the connection devices may connect to the conference call based on the information.

At 611, the connection devices may be queried for capabilities. In some embodiments, the querying may be performed multiple times at a predetermined rate.

At 613, a line status of a line between the connection devices may be monitored. If a connection device is disconnected, the information may be examined from the connection devices to determine which connected connection device the disconnected connection device should reconnect to.

At 615, the connection devices may be ranked using the information from the connection devices, according to their connectability with other connection devices.

At 617, a rule may be used to determine the rank.

Figure 7:
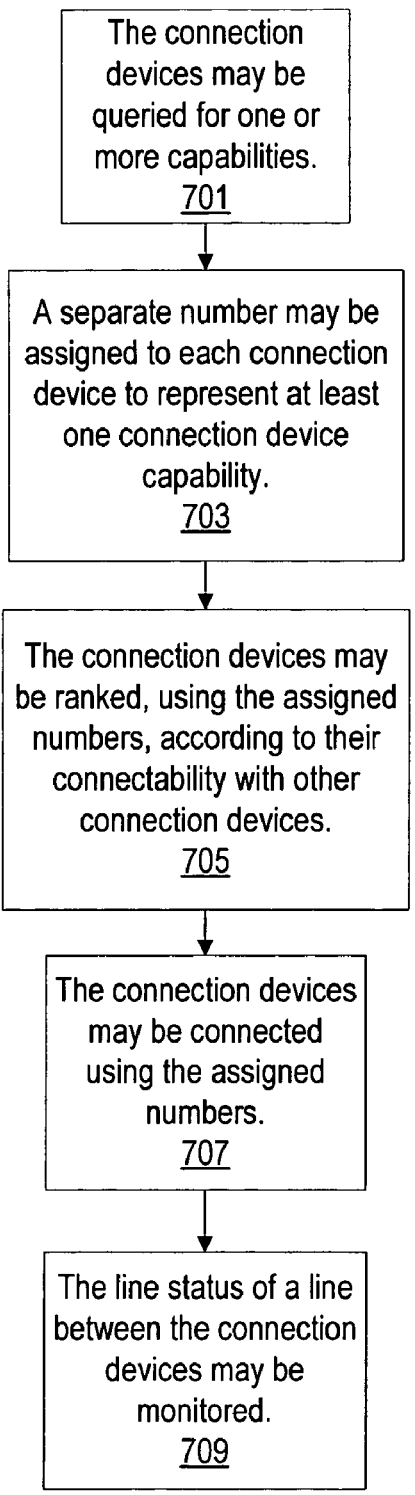
FIG. 7 illustrates a method for connecting multiple connection devices using DCNs, according to an embodiment.

FIG. 7 illustrates a method for connecting multiple connection devices using DCN numbers, according to an embodiment. It is noted that in various embodiments one or more of the method elements may be performed concurrently, in a different order, or be omitted. Additional elements may be performed as desired.

At 701, the connection devices may be queried for one or more capabilities. In some embodiments, querying may be done multiple times at a predetermined rate (e.g., by a management system). In some embodiments, the connection devices may be queried through a translation matrix.

At 703, a separate number may be assigned to each connection device to represent at least one connection device capability.

At 705, the connection devices may be ranked, using the assigned numbers, according to their connectability with other connection devices. In some embodiments, rules may be used to determine the ranking.

At 707, the connection devices may be connected using the assigned numbers.

At 709, the line status of a line between the connection devices may be monitored. If a connection device is disconnected, the assigned numbers may be used to determine which connected connection device the disconnected connection device should reconnect to.

Embodiments of these methods may be implemented from a memory medium. A memory medium may include any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network. In some embodiments, a carrier medium may be used. A carrier medium may include a memory medium as described above, as well as signals such as electrical, electromagnetic, or digital signals, conveyed via a communication medium such as a bus, network and/or a wireless link.

In some embodiments, a method may be implemented from memory medium(s) on which one or more computer programs or software components according to one embodiment may be stored. For example, the memory medium may comprise an electrically eraseable programmable read-only memory (EEPROM), various types of flash memory, etc. which store software programs (e.g., firmware) that is executable to perform the methods described herein. In some embodiments, field programmable gate arrays may be used. Various embodiments further include receiving or storing instructions and/or data implemented in accordance with the foregoing description upon a carrier medium.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for managing a conference call, comprising:
    automatically obtaining first information from at least two connection devices of the conference call, wherein the first information for each connection device specifies a plurality of connection capabilities of that connection device, wherein the plurality of connection capabilities comprises a number of multipoint ports for the corresponding connection device;
    automatically storing the first information in a data structure in a memory, wherein the data structure comprises an alphanumeric string representing the plurality of connection capabilities;
    wherein said automatically obtaining and automatically storing are performed by a software program without user input specifying the obtaining and storing;
    determining routing information based on the first information in the data structure, wherein the routing information indicates, without user intervention, each connection device how to connect to the other connection devices of the conference call, wherein the routing information specifies a first connection device as a host of the conference call, and wherein said determining the routing information is based on the number of multipoint ports of the first connection device; and
    connecting the at least two connection devices using the routing information.

2. The method of claim 1, wherein automatically obtaining the first information from the at least two connection devices comprises:
    querying the at least two connection devices for the plurality of connection capabilities; and
    receiving the plurality of connection capabilities from the at least two connection devices.

3. The method of claim 2, wherein said querying is performed a plurality of times at a predetermined rate.

4. The method of claim 2, wherein said querying is performed by a management system and wherein the at least two connection devices are queried through a translation matrix.

5. The method of claim 1, further comprising
    monitoring at least one connection between the at least two connection devices; and
    if a connection device is disconnected,
        determining to which connection device of the conference call the disconnected connection device should reconnect based on the first information; and
        instructing the disconnected connection device to reconnect to the determined connection device.

6. The method of claim 5, wherein said determining is based on a ranking of the connectability of the determined connection device with other connection devices of the at least two connection devices.

7. The method of claim 1, further comprising:
    ranking the at least two connection devices according to connectability with other connection devices of the at least two connection devices, wherein said ranking is based on the first information from the at least two connection devices and at least one rule.

8. The method of claim 7, wherein the rule is formed based on connectivity needs of the connection devices.

9. The method of claim 1, wherein the alphanumeric string comprises a plurality of fields, each field corresponding to a respective one of the plurality of connection capabilities.

10. The method of claim 9,
    wherein the plurality of fields comprise a bandwidth indicator, a multipoint indicator, a IP indicator, a PRI indicator, a BRI indicator, a V.35 indicator, a V.35 speed indicator, an encrypt indicator, a PSTN indicator, a cell indicator, and a service indicator.

11. The method of claim 1, wherein the plurality of connection capabilities comprise at least two connection capabilities selected from a group consisting of:

maximum bandwidth;
Internet protocol (IP) capabilities;
primary rate interface (PRI);
integrated services digital network (ISDN);
basic rate interface (BRI);
V.35 capability;
V.35 speed,
encryption capability;
public switch telephone network capability (PSTN);
cellular telephone capability; and
status of user subscription.

12. A device for managing a conference call, comprising:
a processor;
a memory medium coupled to the processor;
a port for coupling to at least two connection devices;
wherein the memory medium comprises program instructions executable by the processor to:
 obtain first information from the at least two connection devices, wherein the first information for each connection device specifies a plurality of connection capabilities of that connection device, wherein the plurality of connection capabilities comprises a number of multipoint ports for the corresponding connection device;
 store the first information in a data structure on the memory medium, wherein the data structure comprises an alphanumeric string representing the plurality of connection capabilities;
 wherein said obtaining and storing are performed without user input specifying the obtaining and storing;
 determine routing information based on the first information in the data structure, wherein the routing information indicates, without user intervention, each connection device how to connect to the other connection devices in a conference call, wherein the routing information specifies a first connection device as a host of the conference call, and wherein said determining the routing information is based on the number of multipoint ports of the first connection device; and
 provide the routing information to the at least two connection devices.

13. The device of claim 12, wherein the program instructions executable to obtain the first information from the at least two connection devices are executable to:
 query the at least two connection devices for the plurality of connection capabilities; and
 receive the plurality of connection capabilities from the at least two connection devices.

14. The device of claim 13, wherein the program instructions are executable to query the at least two connection devices a plurality of times at a predetermined rate.

15. The device of claim 13, wherein the program instructions are executable to query the at least two connection devices through a translation matrix.

16. The device of claim 12, wherein the program instructions are further executable to:
 monitor at least one connection between the at least two connection devices; and
 if a connection device is disconnected,
  determine to which connection device of the conference call the disconnected connection device should reconnect based on the first information; and
  instruct the disconnected connection device to reconnect to the determined connection device.

17. The device of claim 16, wherein said determining is based on a ranking of the connectability of the determined connection device with other connection devices of the at least two connection devices.

18. The device of claim 12, wherein the program instructions are further executable to:
 rank the at least two connection devices according to connectability with other connection devices of the at least two connection devices based on the first information from the at least two connection devices and at least one rule;
 wherein the at least one rule is formed based on connectivity needs of the connection devices.

19. The device of claim 12, wherein the alphanumeric string comprises a plurality of fields, each field corresponding to a respective one of the plurality of connection capabilities.

20. The device of claim 19,
wherein the plurality of fields comprise a bandwidth indicator, a multipoint indicator, a IP indicator, a PRI indicator, a BRI indicator, a V.35 indicator, a V.35 speed indicator, an encrypt indicator, a PSTN indicator, a cell indicator, and a service indicator.

21. The device of claim 12, wherein the plurality of connection capabilities comprise at least two connection capabilities selected from a group consisting of:
maximum bandwidth;
Internet protocol (IP) capabilities;
primary rate interface (PRI);
integrated services digital network (ISDN);
basic rate interface (BRI);
V.35 capability;
V.35 speed,
encryption capability;
public switch telephone network capability (PSTN);
cellular telephone capability; and
status of user subscription.

22. The device of claim 12, wherein the at least two connection devices are devices selected from a group consisting of:
wireless Ethernet card;
paging logic;
radio frequency communication logic;
wired Ethernet card;
modem;
digital service line (DSL) device;
Cable modem;
Integrated services digital network (ISDN) device;
asynchronous transfer mode device;
parallel port bus interface;
serial port bus interface;
wired communication device; and
wireless communication device.

23. A computer readable memory medium comprising program instructions for managing a conference call, wherein the program instructions are executable to:
 obtain first information from at least two connection devices, wherein the first information for each connection device specifies a plurality of connection capabilities of that connection device, wherein the plurality of connection capabilities comprises a number of multipoint ports for the corresponding connection device;
 store the first information in a data structure, wherein the data structure comprises an alphanumeric string representing the plurality of connection capabilities;
 wherein said obtaining and storing are performed without user input specifying the obtaining and storing;

determine routing information based on the first information in the data structure, wherein the routing information indicates, without user intervention, each connection device how to connect to the other connection devices in a conference call, wherein the routing information specifies a first connection device as a host of the conference call, and wherein said determining the routing information is based on the number of multipoint ports of the first connection device; and provide the routing information to the at least two connection devices.

24. The computer readable memory medium of claim 23, wherein the program instructions executable to obtain the first information from the at least two connection devices are executable to:

query the at least two connection devices for the plurality of connection capabilities; and receive the plurality of connection capabilities from the at least two connection devices.

25. The computer readable memory medium of claim 23, wherein the program instructions are further executable to:

monitor at least one connection between the at least two connection devices; and if a connection device is disconnected, determine to which connection device of the conference call the disconnected connection device should reconnect based on the first information; and instruct the disconnected connection device to reconnect to the determined connection device.

26. The computer readable memory medium of claim 23, wherein the program instructions are further executable to:

rank the at least two connection devices according to connectability with other connection devices of the at least two connection devices based on the first information from the at least two connection devices and at least one rule.

* * * * *